(12) United States Patent
Bare

(10) Patent No.: US 8,147,341 B2
(45) Date of Patent: Apr. 3, 2012

(54) DRIVE COUPLING

(75) Inventor: Allan Bare, Ingleburn (AU)

(73) Assignee: Allan Bare, Ingleburn, New South Wales (AU)

( * ) Notice: Subject to any disclaimer, the term of this patent is extended or adjusted under 35 U.S.C. 154(b) by 341 days.

(21) Appl. No.: 12/429,903

(22) Filed: Apr. 24, 2009

(65) Prior Publication Data

US 2009/0264206 A1    Oct. 22, 2009

Related U.S. Application Data

(63) Continuation-in-part of application No. 11/448,647, filed on Jun. 7, 2006, now abandoned.

(30) Foreign Application Priority Data

Jun. 9, 2005 (AU) ................................ 2005202504

(51) Int. Cl.
*F16F 15/121* (2006.01)
(52) U.S. Cl. ...................................... 464/68.6; 464/66.1
(58) Field of Classification Search ................. 464/62.1, 464/66.1, 67.1, 68.1, 68.9–68.92, 68.6; 192/203, 192/205, 204
See application file for complete search history.

(56) References Cited

U.S. PATENT DOCUMENTS

| 791,329 | A | * | 5/1905 | Dodge | 464/66.1 |
| 1,603,555 | A | * | 10/1926 | Perkins | 464/62.1 X |
| 2,284,349 | A | * | 5/1942 | Thelander | 464/68.92 |
| 2,513,379 | A | * | 7/1950 | Thelander | 192/205 |
| 4,947,700 | A | * | 8/1990 | Kern et al. | 464/68.9 X |
| 7,966,817 | B2 | * | 6/2011 | Schenck et al. | 464/68.92 X |

* cited by examiner

*Primary Examiner* — Gregory Binda
(74) *Attorney, Agent, or Firm* — Michael F. Krieger; Kirton & McConkie

(57) ABSTRACT

A drive coupling has an inner plate positioned within an inner periphery of an outer plate. The inner plate includes a plurality of outwardly-extending projections. The inner periphery of the outer plate includes a plurality of recesses. A plurality of short heavy-duty compression springs are arranged to compress in a substantially-straight linear direction between respective projections of the inner plate and the respective side wall of the recess of the outer plate. The springs are further retained by spring travel limiting guides which protrude from the outer plate. The inner plate and an associated central shaft are positively supported by bushings and/or bearings which reside in outer retaining plates. These bushings and/or bearings retain the inner and outer plates in a fixed non-yielding radial and axial position. Bolts are used to hold the outer drive plate and the external retaining plates together. The drive coupling is designed to carry the entire rated torque requirement of the unit on the compression springs, thus providing a continual cushioning action to the drive line whilst providing accurately-controlled angular movement if an obstruction is encountered.

11 Claims, 3 Drawing Sheets

DRIVE COUPLING

CROSS-REFERENCE TO RELATED APPLICATIONS

This application is a continuation-in-part of prior Application No. 11/448,647, filed Jun. 7, 2006, now abandoned, which claims priority to Australian Patent 2005202504 filed Jun. 9, 2005.

BACKGROUND OF THE INVENTION

1. Field of the Invention

The present invention relates to drive couplings.

2. Background and Related Art

Drive couplings are used in a wide variety of applications. Some examples of drive couplings include chain couplings, disc couplings, doughnut couplings, universal joints or clutches. Drive couplings are typically used to transmit drive from one shaft to another shaft. The shafts may be formed with the drive coupling or they may be connectable to the drive coupling.

In some applications, the equipment being driven by a drive arrangement may be susceptible to sudden shock loads. For example, large multi head grass and scrub cutting machines (termed rotary cutters or slashers) utilize heavy (16 mm to 19 mm thick) (⅝" to ¾" thick) cutting blades. To achieve overlap between cutters, the gear boxes which are connected in series by power take off drive shafts are timed so that the blades intersect.

These machines are prone to serious gear box and drive shaft failure. For example, when one individual cutter strikes an obstruction, cumulative forces from the tractor power source, combined with the flywheel effect (inertia) from all other gear boxes and cutting heads on the machine are transmitted to the individual gear box and shaft coupling involved in the incident.

Standard friction disc type safety clutches cannot be used on these machines, as the cutting blades can only be paused for a few degrees of rotation before contact occurs with adjacent cutting blades.

The most common method of coupling these gear boxes is via chain couplings, disc couplings, doughnut couplings or universal joints. None of these devices provide any predetermined rotational shock relief to transmissions.

BRIEF SUMMARY OF THE INVENTION

It is an object of the present invention to provide a drive coupling that overcomes or at least ameliorates one or more of the abovementioned disadvantages.

In a first aspect, the present invention provides a drive coupling comprising an inner plate, an outer plate and a plurality of heavy duty coil springs located between the inner plate and the outer plate. Rotation of the inner plate or the outer plate in the direction of drive causes a reaction force in the plurality of springs, said reaction force being transmitted to the other plate.

During normal use of the drive coupling, the inner and outer plate support bearings or bushes and coil springs maintain separation between the inner and outer plates, positively eliminating any radial yield between the inner and outer drive and driven plates.

The inner plate and outer plate are separated and aligned in a longitudinal and axial direction by bearings or bushes located at each end of the coupling.

The short coil springs are arranged such that they lie in a generally circumferential direction, close to the outer circumference of the drive coupling, ensuring compression is applied in a relatively straight line through the centre of the short coil spring.

The drive coupling may further comprise retaining plates or drive hubs attached to either side of the outer plate. These plates or hubs contain bearings or bushings to hold the inner plate in static radial and axial alignment with the outer plate.

The inner plate has a plurality of outwardly extending projections, the outer ends of these projections being held under spring compression by the coil spring and outer plate. The outer plate has a plurality of inner peripheral recesses and protrusions to retain the springs in a compressed condition, Precise control over the amount of rotational travel of the inner plate is achieved by protrusions or projections on the outer plate which extend inside each coil spring to act as a fixed spring guide and rotational travel stop, thus limiting rotational travel to a predetermined amount as specified for driven equipment with timed intersecting blades. These stops also prevent the coil springs from compressing to a coil bound (failure) position. The protrusions or projections may have a length that is shorter than a length of the coil springs and the length of the projections dictates the maximum compression that can be applied to the coil springs. Suitable, the length of the projections is such that the projections prevent the coils from achieving a coil bound condition (in which the adjacent turns or windings of the coil springs contact each other) at maximum compression. It is believed that achieving a coil bound condition can increase the likelihood of spring breakage and so preventing a coil bound condition is likely to enhance reliability of the drive coupling.

The drive to the coupling inner or outer plates may comprise a male shaft or female drive sleeve.

In one embodiment of the present invention, the inner plate has a plurality of outwardly extending projections and the outer plate has a plurality of inner peripheral recesses, the projections of the inner plate extending into respective recesses of the outer plate. A plurality of coil springs, each retained by close fitting internal spring guide travel stops which protrude from the outer drive plate are positioned between a respective projection of the inner plate and a wall of the corresponding recess of the outer plate.

The projections of the inner plate extend in a generally radial direction. The recesses in the inner periphery of the outer plate may be defined by inwardly extending portions of the inner peripheral wall of the outer plate.

Control over the amount of rotational travel of the inner plate is achieved by the protrusions on the outer plate. These protrusions extend inside each coil spring to act as spring locators and spring travel stops, thus limiting internal rotation to a predetermined amount and preventing a coil bound spring condition.

The spring guide projections are sized such that the compression springs fit closely over the projections.

The coil springs may be heavy duty coil springs. The person skilled in the art will readily understand what constitutes a heavy duty coil spring from the context of use of the drive coupling. In some embodiments, the coil springs may have a spring diameter that is approximately equal to the spring length.

The drive coupling of the present invention may further comprise a shaft connected to or formed with one of the inner or outer plates. Preferably, the inner plate has a first shaft formed therewith or attached thereto.

The other plate may also include a shaft formed therewith or connected thereto. In embodiments where a male drive shaft is required, the coupling may include a male member extending from a solid male shaft and extending into a locating bush housed in the flange end of the retaining plate. Suitably, the male member extends through the inner plate and through a bearing in the outer plate.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

In FIG. 1, the retaining plates have been removed for clarity.

DETAILED DESCRIPTION OF THE INVENTION

A description of embodiments of the present invention will now be given with reference to the Figures. It will be appreciated that the drawings attached to the specification have been provided for the purposes of illustrating preferred embodiments of the present invention. Thus, the present invention shall not be considered to be limited to the embodiments shown in the attached drawings.

Figure 1:
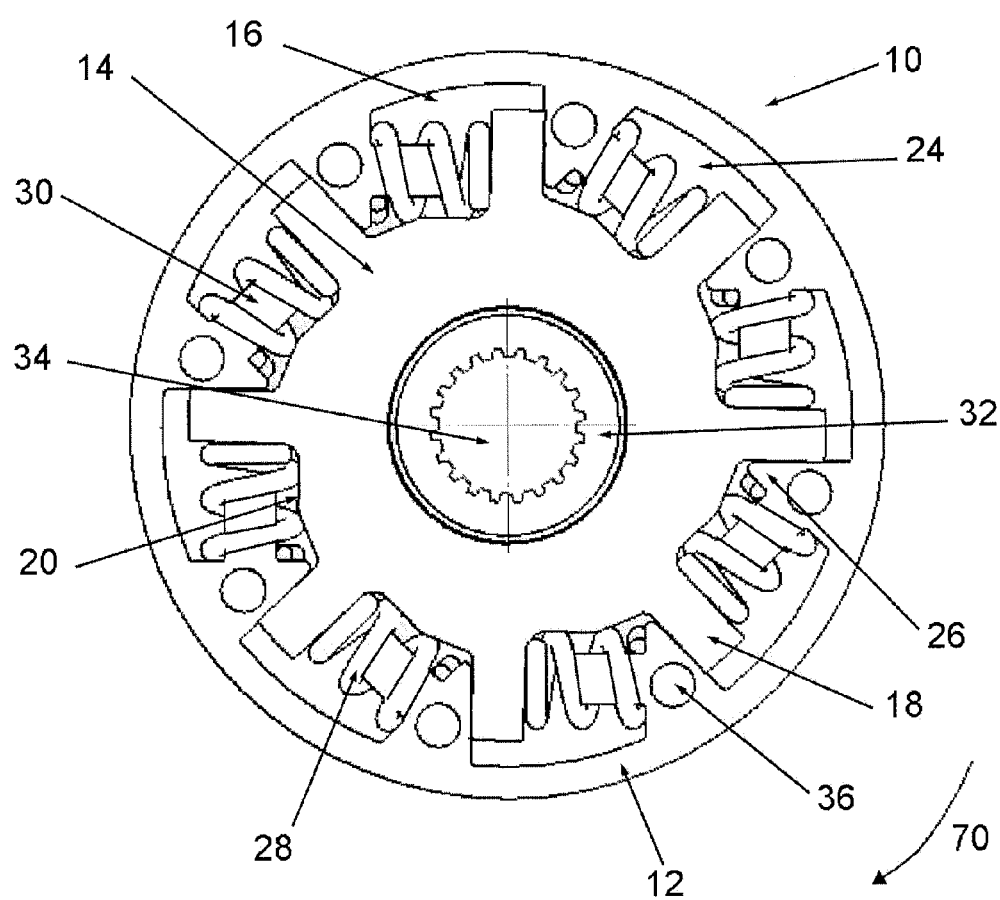
FIG. 1 shows a plan view of a drive coupling in accordance with an embodiment of the present invention.
Figure 2:
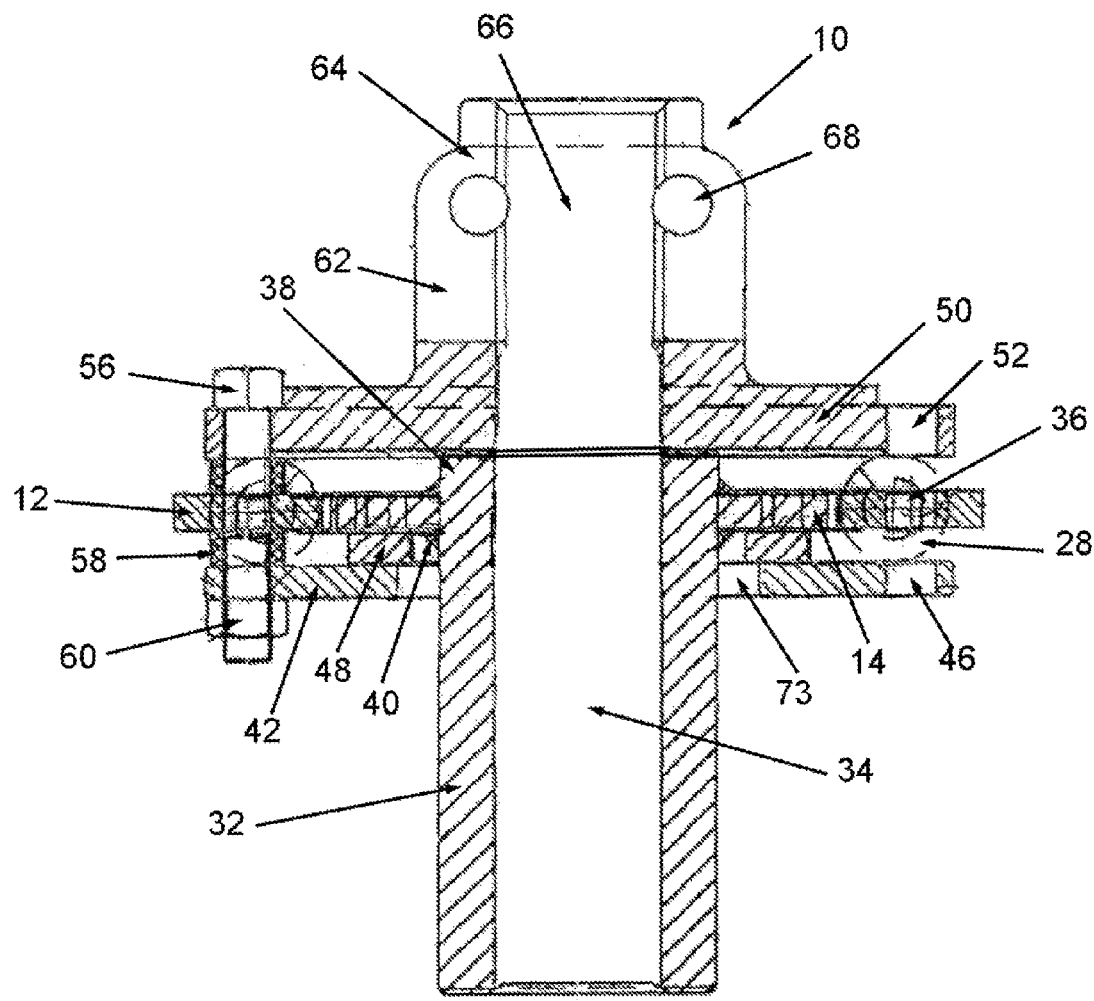
FIG. 2 shows a cross-sectional side view of a drive coupling in accordance with an embodiment of the present invention.

The drive coupling 10 shown in FIGS. 1 and 2 comprises an outer plate 12 and an inner plate 14. As best shown in FIG. 1, inner plate 14 is positioned within the inner periphery 16 of outer plate 12. As best shown in FIG. 2, outer plate 12 and inner plate 14 are in alignment in a longitudinal direction.

The inner plate 14 includes a plurality of outwardly extending projections 18. For the sake of clarity, only some of these projections 18 are numbered in FIG. 1. The projections 18 extend in a generally radial direction. The outer periphery of inner plate 14 includes regions of relatively smaller diameter 20 located between adjacent outwardly extending projections 18.

The inner periphery 16 of outer plate 12 includes a plurality of recesses 24. For the sake of clarity, only some of the recesses 24 have been numbered in FIG. 1. The recesses 24 are bounded by inwardly extending projections 26 on the outer plate 12.

As can be seen from FIG. 1, each projection 18 of the inner plate 14 is positioned such that it is within a corresponding recess 24 defined by the outer plate 12.

The drive coupling 10 further comprises a plurality of short compression springs 28. Compression springs 28 are in the form of heavy duty coil springs in which the spring length is approximately equal to the spring diameter. In one illustrative embodiment of the invention in which the drive coupling is used in a mowing machine, the coil springs may have a length of about 32 mm (1¼ inch) and a spring diameter of about 32 mm (about 1¼ inch). These springs may be made from spring wire having a wire diameter of about 6 mm (¼ inch). For the sake of clarity, only some of the compression springs 28 have been numbered in FIG. 1. As can be seen from FIG. 1, the compression springs 28 are arranged between respective projections 18 of inner plate 14 and the respective side wall of the recess 24 of outer plate 12. As can also be seen from figure 1 no coil spring 28 are located between another face of each of the projections 18 of inner late 14 and the other inwardly extending side wall of the recess 24 of outer plate 12. To assist in positioning the compression springs 28 and control internal rotational travel, the respective walls of recesses 24 are provided with spring travel limiting guides 30. For the sake of clarity, only some of spring travel limiting guides 30 are numbered in FIG. 1. Spring travel limiting guides 30 take the form of a projection extending outwardly from the wall of recess 24, which projection is sized such that the compression spring 28 can be fitted tightly over the spring travel limiting guide 30.

The drive coupling 10 further includes a shaft 32 that is connected to the inner plate 14. Shaft 32 is suitably connected to inner plate 14 by welding. The shaft 32 has a central cavity 34, which cavity 34 is arranged to receive and hold a splined shaft (not shown). In this manner, a splined drive shaft can be connected to shaft 32. The splined shaft that is received within the cavity 34 of shaft 32 may be telescopically movable inside cavity 34.

Figure 3:
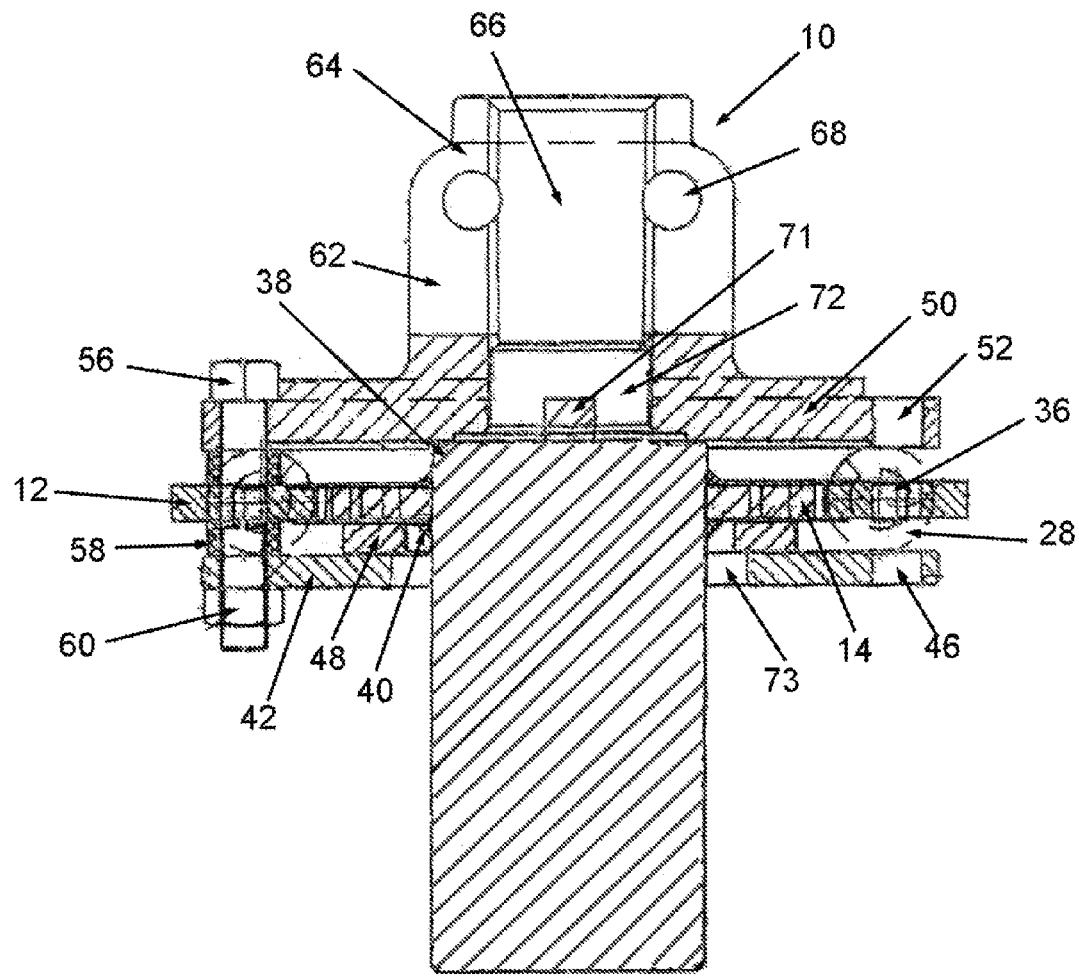
FIG. 3 shows a cross-sectional side view of a drive coupling in accordance with another embodiment of the present invention.

The shaft 32 is supported by a bush and or bearing located in each of two outer retaining plates. In another embodiment, shaft 32 may be in the form of a solid shaft which may be positively located radially by a spigot 71 engaged in a bushing 72, as illustrated in FIG. 3. The opposite end of the shaft 32 may be positively supported by a bearing 73 which is housed within support plate 42. In this manner, relative radial displacement between the inner plate and the outer plate is prevented.

The outer plate 12 further includes a plurality of apertures 36. For the sake of clarity, only some of the apertures 36 have been numbered in FIG. 1. Apertures 36 receive the shanks of bolts that are used to connect the retaining plates to each other. This will be described in greater detail with reference to FIG. 2.

In order to assemble the drive coupling shown in FIG. 1, the compression springs 28 are placed on the spring travel limiting guide projections 30. The compression springs are then compressed by placing inner plate 14 into position such that projections 18 abut on the ends of springs 28 and thereafter rotating inner plate 14 to facilitate assembly. The inner plate 14 can then fit into place within outer plate 12. Alternately, spring compressors may be used to compress the springs and fit the inner plate 14, but this would involve extra steps during assembly of the drive coupling 10. It will be appreciated that the compression springs are retained in place by the respective parts of the outer peripheral wall of inner plate 14, the inner peripheral wall of outer plate 12 and the spring travel limiting guides 30.

As shown in FIG. 2, weld metal 40 is used to connect the inner shaft 32 to the inner plate 14. The shaft 32 extends through a central aperture in inner plate 14 such that a small portion 38 of shaft 32 extends beyond the other side of inner plate 14. A spigot 71 protrudes from the end of the small portion 38 of the shaft 32. This spigot engages with a bush 72 housed in the outer retaining plate 50. Bush 72 may be replaced by a bearing in some embodiments. Portion 38 of shaft 32 serves to align the inner and outer plates, preventing axial movement of the inner plate 14 in one direction.

A spacer ring 48 is fitted between the inner plate 14 and the outer retaining plate 42 to further align the inner and outer plates, preventing axial movement of the inner plate 14 in the alternate direction.

The assembly shown in FIG. 2 includes the outer plate 12 and inner plate 14 arranged as shown with reference to FIG. 1. A first retaining plate 42 having a central bearing 73 that is large enough to fit over shaft 32 is positioned by passing it over shaft 32 such that it reaches the position shown in FIG. 2. First retaining plate 42 includes a plurality of apertures 46. Apertures 46 are positioned such that they can be brought into alignment with the apertures 36 in the outer plate 12 and apertures 52 in the second retaining plate 50.

The assembly shown in FIG. 2 further includes a second retaining plate 50 that is located on the other side (to the side on which first retaining plate 42 is positioned) of the inner and outer plates. Second retaining plate 50 includes a plurality of apertures 52. The plurality of apertures 52 are arranged on second retaining plate 50 such that they can be brought into alignment with the apertures 36 of the outer plate 12.

In order to connect the first and second retaining plates, bolts 56 are inserted through the respective apertures 52, 36 and 46. Spacers 58 are positioned on either side of the outer plate 12 to properly space the first and second retaining plates from the outer plate 12. Nuts 60 are subsequently placed over the threaded ends of bolts 56 and tightened to thereby hold the retaining plates 42 and 50 together. It will be appreciated that the bolts 56 pass through the apertures 36 in the outer plate 12. Furthermore, the spacer ring 48 and the small portion 38 of the shaft 32 are in contact with the respective retaining plates. In this fashion, the retaining plates act to retain the inner plate in axial position relative to the retaining plates (and relative to the outer plate 12). However, the inner plate 14 is only lightly clamped against the retaining plates 42 and 50, and a degree of controlled rotational movement between the inner plate 14 and the retaining plates is possible.

The second retaining plate 50 forms part of a larger structure 62. Structure 62 includes a half split sleeve 64 that is welded to or formed with the second retaining plate 50. Half split sleeve 64 has a cavity 66 that is able to receive a splined shaft (not shown). Bolt holes 68 are provided so that, after inserting a splined shaft into cavity 66, bolts (not shown) can be used to tighten the half split sleeve 64 to thereby prevent axial removal of the splined shaft from the cavity 66. In this manner, the half split sleeve 64 can be connected to a splined shaft, such as a splined drive shaft of a power take off from a tractor, with the splined shaft being constrained against rotational and axial movement relative to the half split sleeve 64.

In use of the assembly shown in FIGS. 1 and 2, the drive shaft (not shown) attached to half split sleeve 64 rotates. The direction of rotation is shown by arrow 70 in FIG. 1. Rotation of the drive shaft will, of course, cause rotation of outer plate 12 in the direction shown by arrow 70 in FIG. 1. This causes compression of the compression springs 28. Compression of the compression springs causes a reaction force to be imparted from the compression springs onto the projections 18 of the inner plate 14. When this reaction force equals the resistance to rotation that is felt by the inner plate 14, the inner plate14 starts to rotate as well. Thus, it can be seen that the drive coupling shown in FIGS. 1 and 2 provides for the continual rated working load of a machine to be transmitted by the compression springs 28. If there are any sudden shocks felt by the machinery being driven by the drive coupling, the sudden shock loads are absorbed by the springs which allow for a predetermined amount of relief rotation of the coupling input shaft. Attempted rotation in the opposite direction to that shown by arrow 70 in FIG. 1 will not cause torque to he transmitted through the compression springs 28.

To assemble drive couplings requiring reverse rotation to that shown in FIG. 1, outer plate 12 and inner plate 14 are inverted during assembly.

The drive coupling shown in the embodiment of the present invention of FIGS. 1 and 2 is designed to carry the entire rated torque requirement of the unit on the compression springs, thus providing a continual cushioning action to the drive line. When a sudden shock load is encountered, the compression springs compress to a predetermined torque value, and a predetermined angular value to provide a predetermined maximum angular movement. If the drive coupling is to be used on a multi head grass and scrub cutting machine, this maximum angular movement can be set such that interaction of the output cutting blades is avoided. Using heavy duty short coil springs to carry the normal torque load of the shaft allows a cushioned drive to be obtained whilst the precision spring travel guide stops allow predetermined maximum angular movement in the event that an obstruction is encountered. The coil springs are suitably short heavy duty coil springs, having a length approximately equal to the spring diameter, for example, a length and diameter from 20 mm to 40 mm, more preferably having a length approximately 32 mm (1¼ inch) and a spring diameter of approximately 32 mm (1¼ inch). By using short heavy duty coil springs, the springs can compress in a substantially linear fashion, thereby minimizing the risk of spring breakage. Further, the inner and outer plates can be positioned in close proximity to each other.

The maximum angular movement allowed for by the drive coupling can be explained by reference to FIG. 1. When the drive coupling is undergoing normal use, the springs 28 are compressed to a small degree in response to the resistance to rotation felt by the inner plate 14. If a shock load is felt, the springs 28 can compress in a relatively straight linear action which is to a maximum extent controlled by the travel limiting spring guides 30 coming into contact with respective projections 18. Suitably, the coils do not adopt a coil bound condition at this maximum compression. Further rotation of the inner plate relative to the outer plate is thereafter not possible, thereby providing for a controlled amount of angular rotation between the inner and outer plates. In other words, precise control over the amount of rotational travel of the inner plate 14 is achieved by the projections 18 on the outer plate 12 which extend inside each spring 28 to act as a fixed spring guide and rotational travel stop, thus limiting rotational travel to a predetermined amount as specified for driven equipment with timed intersecting blades. These stops also prevent the springs 28 from compressing to a coil bound (failure) position. The projections 18 may have a length that is shorter than a length of the springs 28 and the length of the projections 18 dictates the maximum compression that can be applied to the springs 28. Suitable, the length of the projections 18 is such that the projections 18 prevent the springs 28 from achieving a coil bound condition (in which the adjacent turns or windings of the springs 28 contact each other) at maximum compression. It is believed that achieving a coil bound condition can increase the likelihood of spring breakage and so preventing a coil bound condition is likely to enhance reliability of the drive coupling.

The present invention provides a simple yet rugged drive coupling that enables cushioning of shock loads. Embodiments of the invention utilize circumferentially mounted heavy section short coil springs to transmit a cushioned torque load to the output shaft while providing overload travel to a predetermined figure. Torque is transmitted to the springs by one piece inner and outer drive plates obviating the need for multi spring holders and pins. The springs are located (externally and internally) by one piece plates eliminating the possibility and danger of spring dislodgement from the rotating coupling. Both male and female output shafts can be incorporated with accommodation for telescopic power take-off shafts without fear of coupling separation. The drive coupling is able to accept high axial and radial loads by use of the front and rear bearings and/or bushings together with the retaining plate arrangement shown in FIG. 2.

Those skilled in the art will appreciate that the present invention may be subject to variations and modifications other than those specifically described. It is to be understood that the invention encompasses all such variations and modifications that fall within its spirit and scope.

What is claimed and desired to be secured by Letters Patent is:

1. A drive coupling comprising:
   an inner plate having a plurality of outwardly extending projections;
   an outer plate having a plurality of inner peripheral recesses, each of the inner peripheral recesses having two inwardly extending wall portions; and
   a plurality of coil springs,
      each of the outwardly extending projections of the inner plate being positioned within an associated inner peripheral recess of the outer plate, with a coil spring being located between one face of each of the outwardly extending projections of the inner plate and one of the inwardly extending wall portions of the associated inner peripheral recesses of the outer plate, each coil spring being fitted over projections which extend inside each coil spring to act as a fixed spring guide and rotational travel stop, thereby limiting rotational travel to a predetermined amount, there being an absence of any coil spring between another face of each of the projections on the inner plate and the other inwardly extending wall portion of the associated inner peripheral recess on the outer plate;
   wherein rotation of one of the inner plate and the outer plate causes a reaction force in the plurality of coil springs, said reaction force being transmitted to the other of the inner plate and the outer plate to thereby cause rotation of the other plate;
   the drive coupling further comprising a first retaining plate positioned on one side of the inner and outer plates, a second retaining plate positioned on the other side of the inner and outer plates and connecting means to connect the retaining plates together to thereby maintain the inner and outer plates therebetween;
   wherein the inner plate has a first shaft formed therewith or attached thereto and the outer plate has a second shaft associated therewith, wherein the first shaft extends through a bearing or bush in the first retaining plate and a spigot on an end of the first shaft extends into a bearing or bush on the second retaining plate to hold the inner and outer plates in fixed axial relationship.

2. A drive coupling as claimed in claim 1 wherein the projections over which each coil spring is fitted comprise projections protruding from the inwardly extending wall portions of the outer plate.

3. A drive coupling as claimed in claim 1 wherein full drive torque is transmitted through said plurality of coil springs.

4. A drive coupling as claimed in claim 3 where spring compression is achieved in a relatively straight linear condition.

5. A drive coupling as claimed in claim 1 wherein said projections extending inside each coil spring have a length that is shorter than a length of the coil springs and the length of the projections extending inside each coil spring prevent the coil springs achieving a coil bound condition during maximum compression.

6. A drive coupling as claimed in claim 1 whereby said coil springs are provided to transmit torque in only one direction of rotation.

7. A drive coupling as claimed in claim 1 wherein the retaining plates are connected to the outer plate.

8. A drive coupling as claimed in 1 wherein the inner and outer plates are held in fixed radial and axial relationship by said bearings and/or bushes located within the first and second retaining plates.

9. A drive coupling comprising:
   an inner plate having a plurality of outwardly extending projections;
   an outer plate having a plurality of inner peripheral recesses, each of the inner peripheral recesses having two inwardly extending wall portions;
   a shaft formed with or connected to one of the inner plate and the outer plate, the shaft passing through a bearing or bushing to locate the shaft in fixed axial position relative to one of the inner plate and the outer plate and the shaft having an end supported in a further bearing or bushing to locate the shaft in fixed axial and radial position relative to the other of the inner plate and the outer plate; and
   a plurality of coil springs,
      each of the outwardly extending projections of the inner plate being positioned within an associated inner peripheral recess of the outer plate, with a coil spring being located between one face of each of the outwardly extending projections of the inner plate and one of the inwardly extending wall portions of the associated inner peripheral recesses of the outer plate, each coil spring being fitted over projections which extend inside each coil spring to act as a fixed spring guide and rotational travel stop, thereby limiting rotational travel to a predetermined amount, said projections having a length that is shorter than a length of the coil springs and the length of the projections prevents the coil springs achieving a coil bound condition during maximum compression, there being an absence of any coil spring between another face of each of the projections on the inner plate and the other inwardly extending wall portion of the associated inner peripheral recess on the outer plate,
   wherein rotation of one of the inner plate and the outer plate causes a reaction force in the plurality of coil springs, said reaction force being transmitted to the other of the inner plate and the outer plate to thereby cause rotation of the other plate,
   wherein the inner plate and the outer plate are arranged in fixed axial and radial position relative to each other.

10. A drive coupling as claimed in claim 9 further comprising a first retaining plate positioned on one side of the inner and outer plates, a second retaining plate positioned on the other side of the inner and outer plates and connecting means to connect the retaining plates together to thereby maintain the inner and outer plates therebetween, the shaft passing through the bearing or bushing on one of the first retaining plate or second retaining plate to thereby locate the shaft in fixed axial and radial position relative to the one of the inner plate and the outer plate.

11. a drive coupling as claimed in claim 10, wherein the further bearing or bushing is located in the other of the first retaining plate or the second retaining plate.

* * * * *